United States Patent

Van der Tempel et al.

[11] Patent Number: 6,033,279
[45] Date of Patent: Mar. 7, 2000

[54] METHOD OF MANUFACTURING A DISPLAY DEVICE WITH REDUCED THERMAL STRESS

[75] Inventors: Leendert Van der Tempel; Hans Galenkamp; Richard B. J. Droste, all of Eindhoven, Netherlands

[73] Assignee: U.S. Philips Corporation, New York, N.Y.

[21] Appl. No.: 08/909,920

[22] Filed: Aug. 12, 1997

[30] Foreign Application Priority Data

Aug. 19, 1996 [EP] European Pat. Off. .............. 96202308

[51] Int. Cl.⁷ ...................................................... H01J 9/26
[52] U.S. Cl. ................................................ 445/45; 432/10
[58] Field of Search .............................. 445/45; 432/10, 432/77; 313/495, 479, 466

[56] References Cited

U.S. PATENT DOCUMENTS

| | | | |
|---|---|---|---|
| 2,856,174 | 10/1958 | Daley et al. | 432/10 |
| 2,868,533 | 1/1959 | Pratt | 432/10 |
| 3,791,546 | 2/1974 | Maley et al. | 313/479 |
| 4,079,104 | 3/1978 | Dickson et al. | 432/10 |
| 4,092,444 | 5/1978 | Kilichowski | 313/479 |
| 4,498,884 | 2/1985 | Stover et al. | 445/45 |
| 4,923,423 | 5/1990 | Stockdale et al. | 445/45 |
| 5,188,553 | 2/1993 | Dougherty | 445/45 |
| 5,256,341 | 10/1993 | Denis et al. | 432/10 |
| 5,604,289 | 2/1997 | Delimoy | 524/496 |

*Primary Examiner*—Kenneth J. Ramsey
*Attorney, Agent, or Firm*—John C. Fox

[57] ABSTRACT

A method in which a (display) device having a part (41) comprising a first wall (43) and a second wall (44) is manufactured, which part (41) is warmed up during the temperature treatment by unilateral irradiation with heat by means of heat radiators (35). The method is characterized in that the temperature treatment further comprises measures which cause a fluid (53) to be fed past the outer surface of the first wall (43) to remove heat from said outer surface and/or measures which cause a fluid to be fed past the inner surface of the second wall (44) to supply heat to said second surface. In an embodiment, the inner surface of the second wall (44) is provided with a heat-absorbing coating (48). Preferably, the heat radiators (35) emit electromagnetic radiation having a wavelength below 3 μm.

7 Claims, 3 Drawing Sheets

METHOD OF MANUFACTURING A DISPLAY DEVICE WITH REDUCED THERMAL STRESS

BACKGROUND OF THE INVENTION

The invention relates to a method of manufacturing a device having a part which comprises a wall having a first surface and an oppositely located second surface, said part being subjected to a temperature treatment in which said part is heated by irradiation with heat via the first surface by means of heat radiators.

The invention further relates to a heater for carrying out the method.

The invention also relates to a display device having a part which comprises a wall and which is treated in accordance with said method.

Such a method is used in the manufacture of camera tubes, image amplifiers, oscilloscopes, lamps and, in particular, cathode ray tubes (CRTs) for displaying monochromatic images or color images. Such a method is also used in the manufacture of thin-type display devices in vacuum tubes, plasma displays and plasma-addressed liquid-crystal display devices (PALC displays).

A method of the type mentioned in the opening paragraph is known from United States Patent U.S. Pat. No. 4,498,884 (PHN 9.980). In said document, a description is given of a method which relates to the manufacture of a display device comprising a display screen with a raised edge and a cone, the display screen and the cone being subjected to a temperature treatment in a furnace. To reduce the stresses occurring in the display screen, measures are taken to minimize differences in thermal expansion between the outermost and innermost surfaces of the display device during the warm-up part of the temperature treatment. According to these measures, a heat shield is provided on or at some distance from (the central part) of the display screen, said heat shield being provided with a pattern of apertures.

A disadvantage of the known method is that a (patterned) heat shield is a complicated construction and therefore less suitable for use in mass-production processes. In addition, for every type of display screen, which each have a different size (dimensions) and thickness, other heat shields must be constructed and tested, and the heat shields must be exchanged if, in the manufacturing process, a changeover from one type of display screen to another type of display screen is effected.

OBJECTS AND SUMMARY OF THE INVENTION

It is an object of the invention to provide a simple, rapid and flexible method of reducing the stresses occurring in the wall of the part (display screen and/or cone), and to provide a heater which can suitably be used in this method. The invention further aims at providing a display device which is treated in accordance with this method.

To this end, the method in accordance with a first aspect of the invention is characterized in that the temperature treatment comprises further measures which, during heating of the part, cause the temperature of the second surface to be increased or the temperature of the first surface to be reduced.

The inventors have recognized that, in the manufacturing process of the device, during the temperature treatment of the wall of the part, the warm-up rate and the cooling rate of the wall are limited by the temperature-stress distribution and the thermoelastic stress distribution across the thickness of said part. In general, fracture of the part is precluded by keeping the tensile-stress distribution of the wall below the breaking-stress distribution of the wall during the temperature treatment. During the warm-up of the wall of the part by irradiation with heat originating from heat radiators via the first surface of the wall, (low-stress) heating of the interior of the wall of the part causes the first surface of the wall to be warmed up. In general, the first surface of the wall is warmed up more rapidly than the interior of the wall. This non-uniform warm-up limits the rate at which the wall of the part can be warmed up, because fracture of the part caused by non-uniform warm-up of the wall during the manufacture of the part of the device is undesirable.

In the manufacture of the part, the wall of the part can be rapidly warmed up in a simple manner if, during the temperature treatment of the wall of the part, measures are taken which cause the temperature of the second surface of the wall to be increased or the temperature of the first surface of the wall to be reduced, the risk of undesirable fracture of the part being prevented. By virtue thereof, the manufacturing rate of the part of the device can be increased substantially. In other words, a rapid and efficient method of manufacturing said part of the device is obtained by taking measures, during warm-up of the wall of the part, which cause additional heat to be supplied to the second surface of the wall and/or by taking measures which prevent the first surface of the wall from warming up more rapidly than the interior of the wall of the part and/or by taking measures which cause heat to be removed from the first surface of the wall during the warm-up of the wall of said part. Due to the absence of a heat shield, stresses occurring in the part (display screen) are reduced in a simple manner and a more uniform temperature distribution over the interior (of the wall) of the part is achieved.

An embodiment of the method in accordance with a first aspect of the invention is characterized in that, in operation, the heat radiators emit predominantly electromagnetic radiation having a wavelength below 3 $\mu$m.

Upon irradiation with heat originating from (predominantly infrared) heat radiators via the first surface of the wall of the part, in general, long-wave electromagnetic radiation (having a wavelength $\lambda$ above 3 $\mu$m) penetrates hardly, or not at all, into the interior of the wall of the part, but instead this heat is dissipated directly at the first surface and in a relatively thin layer just below the first surface of the wall. As a result, said long-wave radiation causes a substantial increase in temperature at the first surface and in the relatively thin layer just below said first surface, while the (further) interior of the wall of the part is warmed up relatively slowly. The attendant (substantial) difference in temperature across the thickness of the wall of the part leads to an increase of the tensile-stress distribution across the thickness of the wall. As a result, fracture of the part upon irradiation with long-wave radiation can only be precluded if said part is heated only slowly, which is undesirable.

Upon irradiation with heat originating from heat radiators via the first surface of the wall of the part, short-wave radiation (having a wavelength $\lambda$ below 3 $\mu$m, preferably between 0.3 and 2.7 $\mu$m) generally penetrates deep into the interior of the wall and relatively little, if any, heat is dissipated directly at the surface of the wall. Thus, as a result of the short-wave radiation the first surface and the relatively thin layer just below said first surface are not heated to such a high temperature, but instead the (further) interior of the wall of the part is heated to a relatively high temperature as compared to the temperature in the case of irradiation with long-wave radiation. The attendant relatively flat temperature gradient (good, uniform temperature distribution) across the thickness of the wall enables the part to be warmed up relatively rapidly, while fracture of said part caused by too high a tensile-stress distribution is precluded. By using heat radiators which warm up the interior of the part by absorption of short-wave radiation ($\lambda \leq 3$ μm) instead of heat radiators which only emit long-wave radiation ($\lambda > 3$ μm) or instead of heat radiators which emit long-wave radiation and short-wave radiation, the rate at which (the part of) the device can be manufactured is increased substantially. In other words, a rapid and efficient method of manufacturing (the part) of the device is achieved by taking measures, during warm-up of the wall of the part, which prevent the first surface of the wall from being warmed up more rapidly than the interior of the wall of the part (the use of (infrared) heat radiators which emit predominantly electromagnetic radiation having a wavelength $\lambda$ below 3 μm).

An embodiment of the method in accordance with a first aspect of the invention is characterized in that the second surface is provided with an absorbing coating. The expression "absorbing coating" is to be understood to mean in this context a radiation-absorbing coating, for example a coating on the second surface, said coating converting radiation into heat. Examples of such a coating are iron oxide and silicates.

In general, if the wall of the part is unilaterally irradiated or heated, a parabolic temperature distribution across the thickness of the wall takes place, i.e. a gradual decrease in temperature takes place as the distance from the irradiated (first) surface increases, and, in general, the temperature is relatively low in the vicinity of the side of the wall (second surface) facing away from the heat radiators. By providing a (radiation) absorbing coating on the second surface of the wall of the part, a relatively large proportion of the (infrared) electromagnetic radiation is dissipated, so that the temperature of the wall becomes relatively high as compared to the case in which the (radiation-) absorbing coating is absent. By increasing the temperature of the second surface, the wall is heated more uniformly, so that also the temperature distribution across the thickness of the wall becomes more uniform. As a result, the wall of the part can be warmed up more rapidly due to a more favorable tensile-stress distribution throughout the wall.

A further advantage of the application of a(n) (radiation-) absorbing coating to the second surface of the wall, said wall of the part being irradiated via the first surface, is that the electromagnetic radiation can be used to selectively increase the temperature of the absorbing coating, without a simultaneous excessive increase of the temperature of the interior of the wall. If annealing and/or degassing of this (absorbing) coating is desirable during the manufacture of the device, this can be achieved in the above-described manner by means of relatively low-energy annealing and/or degassing processes.

A preferred embodiment of the method in accordance with a first aspect of the invention is characterized in that the measures taken cause a fluid to be fed past the first surface, during heating of the part, to remove heat from said first surface.

As indicated hereinabove, unilateral irradiation or heating of the wall of the part leads to a parabolic temperature distribution across the thickness of the wall, the temperature of the irradiated (first) surface and of the relatively thin layer just below said (first) surface being highest, whereafter the temperature decreases gradually across the thickness of the part. By feeding a fluid (gas or liquid) past the first surface, during heating of the part, heat is removed from said first surface, so that the temperature of the (first) surface and of the relatively thin layer just below the (first) surface decreases, which leads to a more uniform heating of the wall of the part, resulting in a more uniform temperature distribution across the thickness of the wall. In general, the fluid used to remove heat has a lower temperature than the temperature of the first surface. By virtue of the improved, uniform heating of the wall, the whole of the wall of the part can be warmed up more rapidly, so that a rapid and efficient method of manufacturing the part of the device is obtained.

The fluid preferably comprises a gas of the group formed by nitrogen, oxygen and helium or said fluid comprises water.

A preferred embodiment of the method in accordance with a first aspect of the invention is characterized in that the measures taken cause a fluid to be fed past the second surface, during heating of the part, to supply heat to said second surface.

In general, the temperature of the fluid used to supply heat is higher than the temperature of the second surface.

As indicated hereinabove, unilateral irradiation or heating of the wall of the part leads to a parabolic temperature distribution across the thickness of the wall, i.e. the temperature decreases gradually as the distance from the irradiated (first) surface increases, and, in general, the temperature is relatively low near the side of the wall (second surface) facing away from the heat radiators. By feeding a fluid (gas or liquid) past the first surface, during heating of the part, additional heat can be supplied to said second surface, so that the temperature of the second surface increases and heating of the wall of the part takes place more uniformly (a more uniform temperature distribution across the thickness of the wall). An increase of the temperature of the second, relatively cold surface, leads to a more uniform heating of the wall, so that the temperature distribution across the thickness of the wall becomes more uniform. As a result, the wall of the part can be warmed up more rapidly because too high a tensile-stress distribution over the wall is precluded. The improved uniform heating of the wall enables the whole of the wall of the part to be warmed up more rapidly, so that a rapid and efficient method of manufacturing the part of the device is achieved.

In general, the most desirable temperature distribution across the thickness of the wall can be represented by a parabola, which parabola has a minimum in the center of the wall. In this manner, the wall can be warmed up most rapidly, while the risk of fracture of said wall is small.

To this end, the method in accordance with a second aspect of the invention is characterized in that, in operation, the heat radiators predominantly emit electromagnetic radiation having a wavelength below 3 μm.

When heat originating from heat radiators is irradiated via the first surface of the wall of the part, electromagnetic radiation having a wavelength $\lambda$ below 3 μm (short-wave radiation) generally penetrates into the interior of the wall, and relatively little heat is dissipated directly at the first surface of the wall. As a result, short-wave radiation does not lead to intense heating of the first surface and of the relatively thin layer just below said (first) surface, but instead a relatively rapid heating of the (further) interior of the wall of the part takes place. The attendant relatively flat temperature gradient (good uniform temperature distribution) across the thickness of the wall enables the part to be warmed up relatively rapidly, while fracture of the part caused by too high a tensile-stress distribution is precluded. By using (infrared) heat radiators which emit predominantly electromagnetic radiation having a wavelength λ below 3 μm (preferably having a wavelength in the range between 0.3 and 2.7 μm) a rapid and efficient method of manufacturing (the part) of the device is achieved.

The first and the second aspect of the invention can also be combined to achieve the object of the invention, i.e. the provision of a simple, rapid and flexible method of reducing the stresses occurring in the part (display screen and/or cone).

These and other aspects of the invention will be apparent from and elucidated with reference to the embodiments described hereinafter.

BRIEF DESCRIPTION OF THE DRAWINGS

In the drawings.

The Figures are purely schematic and not drawn to scale. In particular for clarity, some dimensions are exaggerated strongly. In the Figures, like reference numerals refer to like parts, whenever possible.

DESCRIPTION OF THE PREFERRED EMBODIMENTS

Figure 1A:
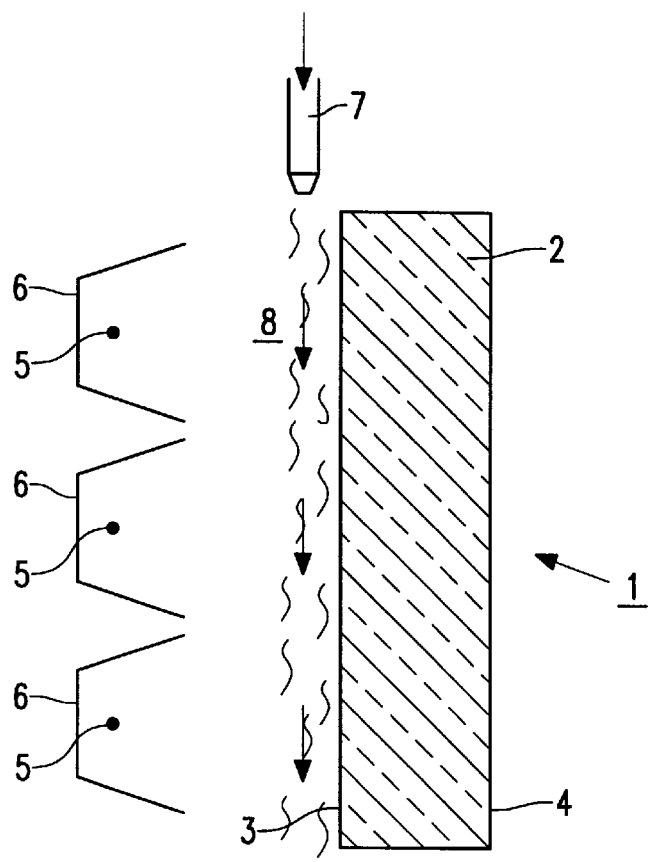
FIGS. 1A, 1B and 1C are schematic, cross-sectional views of a wall of a part of a device in accordance with the invention.
Figure 1B:
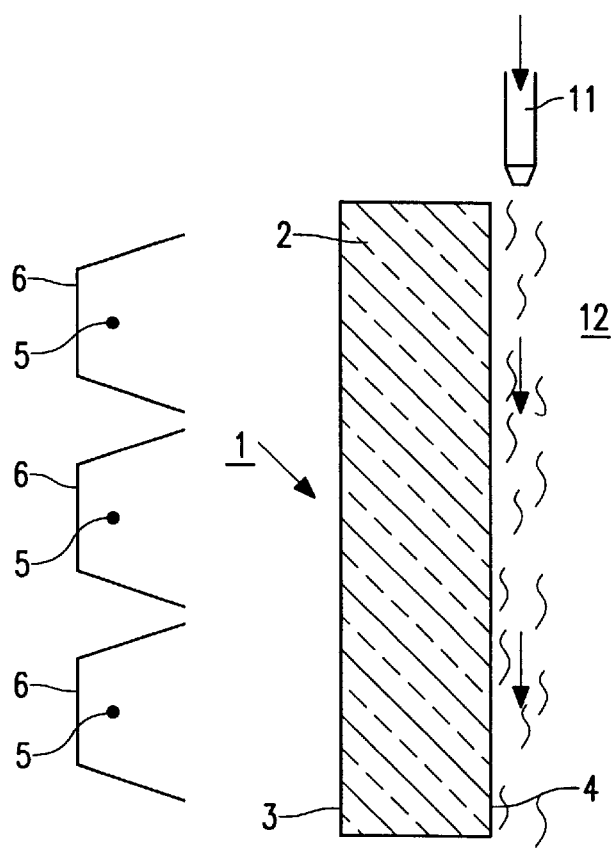
Figure 1C:
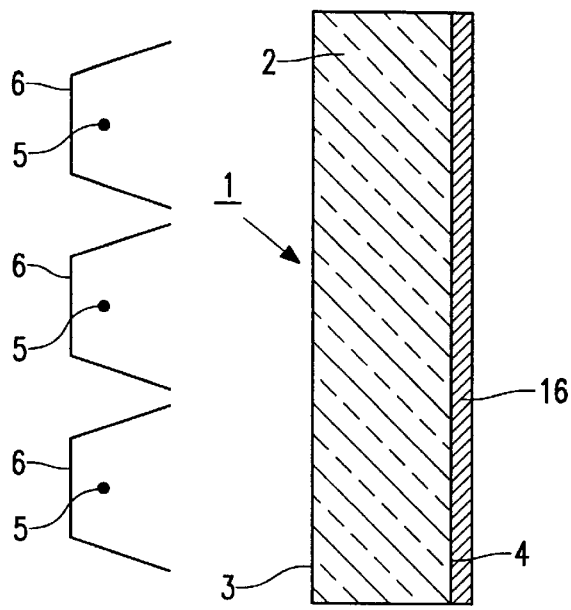

FIGS. 1A, 1B and 1C very schematically show a cross-sectional view of a wall 2 of a part 1 of a device. Said part 1 is subjected to a temperature treatment which consists in the (unilateral) irradiation with heat via a first surface 3 of the wall 2 of the part 1, by means of heat radiators 5. Said heat radiators 5 predominantly comprise infrared heat radiators. To direct the (heat) radiation originating from the heat radiators 5 towards the first surface 3 of the wall 2, reflectors 6 are used in the examples illustrated in FIGS. 1A, 1B and 1C.

Figure 2:
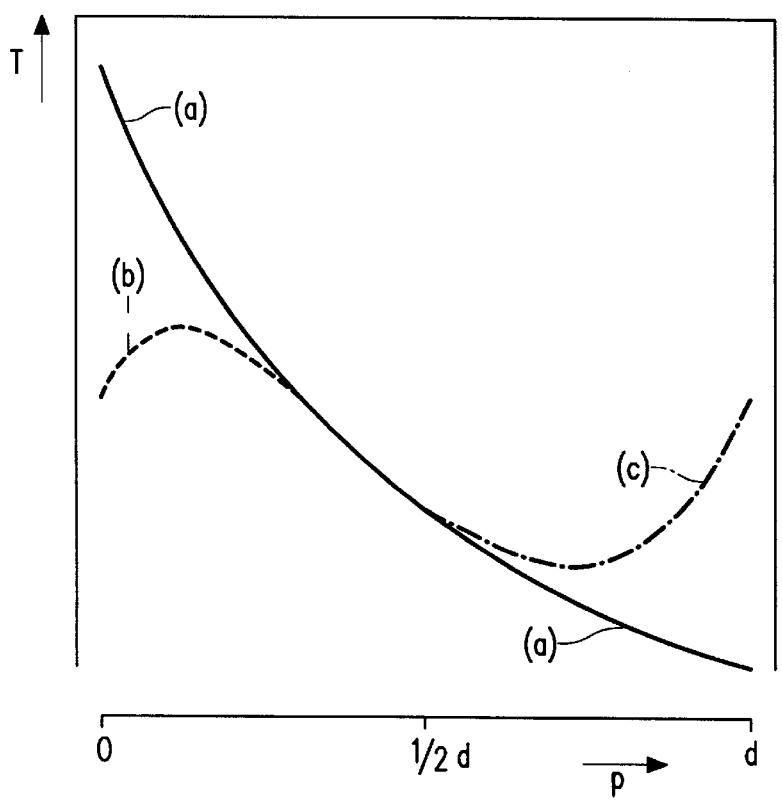
FIG. 2 schematically shows the temperature T of the wall as a function of the position in said wall.

Said unilateral irradiation (or heating) of the wall 2 of the part 1 leads to a (parabolic) temperature distribution across the thickness of the wall 2. An example of such a temperature distribution is shown in FIG. 2, in which the temperature T of the wall 2 is shown as a function of the position p in wall 2. The position p=0 corresponds to the temperature of the wall 2 at the location of the first surface 3 of the wall, while the position p=d corresponds to the temperature of the wall 2 at the location of the second surface 4 of the wall. The curve indicated by (a) in FIG. 2 shows that the temperature decreases gradually as the distance from the irradiated, first surface 3 (position p=0) increases and that, in general, the temperature is relatively low near the side of the wall facing away from the heat radiators, i.e. at the second surface 4 (position p=d). The degree of heating by the heat radiators 5 determines the slope of the temperature distribution over the wall 2 of part 1. Large temperature differences across the thickness of the wall lead to relatively large tensile stresses over the wall 2 and hence increase the risk of fracture of the wall 2, which is undesirable.

In the example of FIG. 1A, a fluid 8 (gas or liquid) is fed past the first surface 3, during heating of the wall 2 of the part 1, so that heat is removed from said first surface 3 of the wall 2, which leads to a reduction of the temperature of the first surface 3 and of the relatively thin layer just below the first surface 3, so that a more uniform heating of the wall 2 of the part 1 and hence a more uniform temperature distribution across the thickness of the wall 2 is achieved.

An example of such a temperature distribution is shown in curve (b) of FIG. 2, which curve shows that the temperature near the irradiated, first surface 3 is much lower than the temperature of the first surface 3 which is not cooled by means of the fluid 8 (curve (a)). The degree of heating by the heat radiators 5 determines the slope of the temperature distribution over the wall 2 of the part 1. Cooling of the first surface 3 causes the temperature differences across the thickness of the wall to be relatively small, so that the tensile stresses throughout the wall 2 are relatively small and the risk of fracture of said wall 2 is reduced substantially. As a result of this measure, the whole of the wall 2 can be warmed up more rapidly, so that a rapid and efficient method of manufacturing the part 1 of the device is achieved. A measure (a more uniform temperature distribution over the interior of the wall) reduces the stresses occurring in the part (display screen and/or cone) in a simple manner.

The fluid 8 is fed past the first surface 3 of the wall 2, for example, via one or more nozzles 7 which are provided near an edge of said wall 2. To achieve a more homogeneous distribution of the fluid over the first surface 3 of the wall 2, use can be made of an apertured grid or plate. Gases which can suitably be fed past the first surface 3 of the wall 2 include nitrogen, oxygen and helium or combinations of these gases. Water is a suitable (cooling) liquid. In general, the temperature of the fluid is lower than the temperature of the first surface 3 of the wall 2. A very suitable gas is air, either (pre-)heated or not.

In the example of Fig. 1B a fluid 12 (gas or liquid) is fed past the second surface 4, during heating of the wall 2 of the part 1, so that (additional) heat is supplied to the second surface 4 of the wall 2, resulting in an increase of the temperature of the first surface 4 and of the relatively thin layer just below the first surface 4, so that the wall 2 of the part 1 is heated more uniformly, which results in a more uniform temperature distribution across the thickness of the wall 2.

An example of such a temperature distribution is shown in curve (c) in FIG. 2, which curve shows that the temperature near the side of the wall 2 facing away from the heat radiators, i.e. the second surface 4, is much higher than it would be without (additional) heating via the fluid 12 (curve (a)). The degree of heating by the heat radiators 5 determines the slope of the temperature distribution over the wall 2 of the part 1. As a result of the (additional) heating of the second surface 4, the temperature differences across the thickness of the wall 2 are relatively small, so that the tensile stresses throughout the wall 2 are relatively limited and the risk of fracture of the wall 2 is reduced substantially. This measure enables the whole of the wall 2 to be warmed up more rapidly, so that a rapid and efficient method of manufacturing the part 1 of the device is achieved. The measure (a more uniform temperature distribution over the interior of the wall) reduces the stresses occurring in the part (display screen and/or cone) in a simple manner.

The fluid 12 is fed past the second surface 4 of the wall 2, for example, via one or more nozzles 11 which are provided near an edge of the wall 2. To obtain a more homogeneous distribution of the fluid over the second surface 4 of the wall 2, an apertured grid or plate may be used. Gases which can suitably be fed past the second surface 4 of the wall 2 include nitrogen, oxygen and helium or combinations thereof. In principle, use can also be made of liquids. In general, the temperature of the fluid is higher than the temperature of the second surface 4 of the wall 2. A gas which is particularly suitable is pre-heated air.

In the example of FIG. 1C, the second surface 4 of the wall 2 is coated with a(n) (radiation-) absorbing coating 16. This causes a relatively large part of the (infrared) electromagnetic radiation originating from the heat radiator 5 to be dissipated in the coating 16. An increase of the temperature of the second surface 4 leads to a more uniform heating of the wall 2, so that the temperature distribution across the thickness of said wall 2 becomes more uniform. By virtue thereof, the wall 2 of the part 1 can be warmed up more rapidly as too high a tensile-stress distribution over the wall 2 is precluded.

A further advantage of the use of a(n) (radiation-) absorbing coating 16, which is provided on the second surface 4 of the wall 2, which wall 2 of part 1 is irradiated via the first surface 3, is that the electromagnetic radiation can be used to selectively increase the temperature of the absorbing coating 16, without a simultaneous, excessive increase of the temperature of the interior of the wall 2. This has a favorable effect if the absorbing coating 16 cannot be irradiated directly, which is the case, for example, if the absorbing coating 16 is provided on the inner surface of a cone (of a cathode ray tube) of a display device (display tube). If, during the manufacture of the device, annealing and/or degassing of this (radiation-) absorbing coating 16 is desirable this can be carried out in the above-described manner at (a lower temperature and) a relatively low energy consumption.

Figure 3:
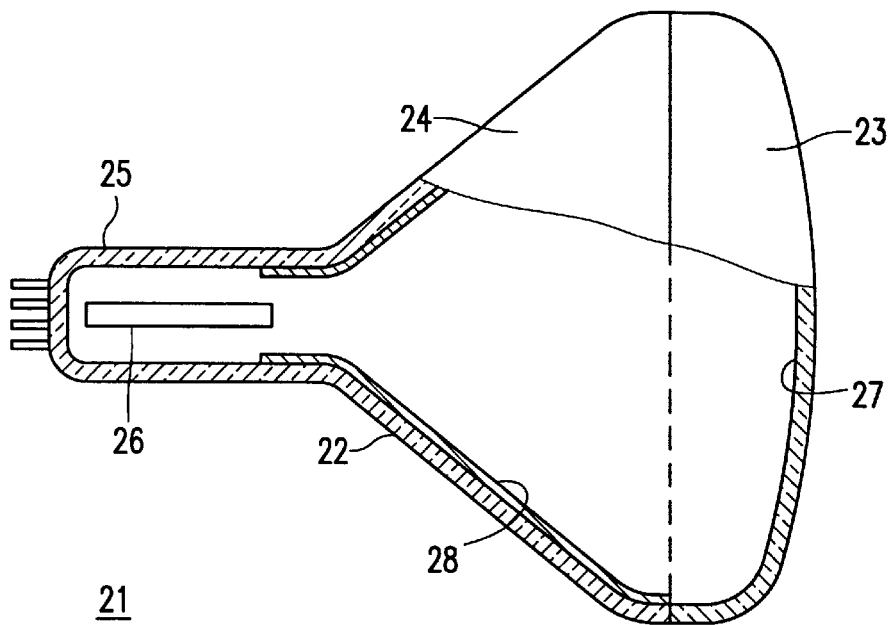
FIG. 3 is a schematic, partly cut-away view of a display device comprising a cathode ray tube.

FIG. 3 is a very schematic, cut-away view of a display device comprising a cathode ray tube 21 having a glass envelope 22 which includes a display screen 23, a cone 24 and a neck 25. In the neck 25, there is an electron gun 26 for generating one or more electron beams. The electron beam is focused on a phosphor layer 27 on the inner surface of the display screen 23 and deflected across the display screen 23 in two mutually perpendicular directions by means of a deflection coil system (not shown in FIG. 3). The inner surface of the cone 24 is provided with a coating 28.

Display devices often comprise cathode ray tubes or television display tubes 21 which are entirely made of glass and which are built up of two or more portions with glass walls of different thicknesses or different heat-absorption characteristics. For example, a glass television display tube 21 customarily comprises a glass display screen 23 and a glass cone 24 which are separately produced and subsequently united by fusing or by using a (solder) glass frit, the joint formed being hermetically tight. The display screen 23 of such tubes is formed by a glass wall whose thickness is much greater than the wall thickness of the cone parts of such tubes. Such a greater wall thickness of the display screen 23 serves to ensure that it is sufficiently rigid when the eventual tubes comprising such a screen are evacuated. Bringing the wall of the part to the required temperature is generally achieved by means of infrared heat radiators and/or by circulation of hot air around the part and/or by applying other heat sources. In the case of hot-air heating, the part is generally arranged in a housing chamber which is constructed so that the circulating hot air heats the part (indirectly). If, in accordance with the invention, relatively cold air is selectively led past portions of the wall of the part and/or relatively hot air is led past further portions of the wall, a more uniform temperature distribution over the wall of the part can be achieved and hence the rate at which the part is heated can be increased substantially. The use of cold air seems to lead to a less efficient warm-up of the part, however, by striking a proper balance between heating and, at the same time, selective cooling a more uniform temperature distribution across the thickness of the wall is achieved and/or a more homogeneous warm-up of parts of the television display tube is brought about, which parts may have large differences in wall thickness.

To degas specific components and materials situated on the inner surface of walls of cathode ray tubes, such tubes, which are predominantly made of glass, are subjected to an annealing treatment or a thermal treatment which is carried out concurrently with the evacuation of the tubes because these steps are preferably carried out simultaneously during processing of the tubes. When the (glass) tubes are subjected to an annealing treatment or to a cycle of thermal treatments, it should be taken into account that the above-mentioned regions or parts of the tubes have different wall thicknesses and that there may be a difference in the degree of heating of such walls during the annealing process, so that such an annealing treatment or thermal treatment should not be carried out at too high a rate because this might cause breakage or implosion of the tubes as a result of too high a thermal load between said different regions or parts of the tubes. Irradiation with heat originating from (infrared) heat radiators via the surface of the wall which is provided with the absorbing coating, causes, in particular, short-wave electromagnetic radiation (having a wavelength $\lambda$ below 3 $\mu$m, preferably in the range $0.3 \leq \lambda \leq 2.7$ $\mu$m) to generally penetrate deep into the interior of the (glass) wall of the part, so that the (short-wave) electromagnetic radiation can be used to selectively increase the temperature of the absorbing coating without a concurrent, excessive increase of the temperature of the interior of the wall.

Figure 4:
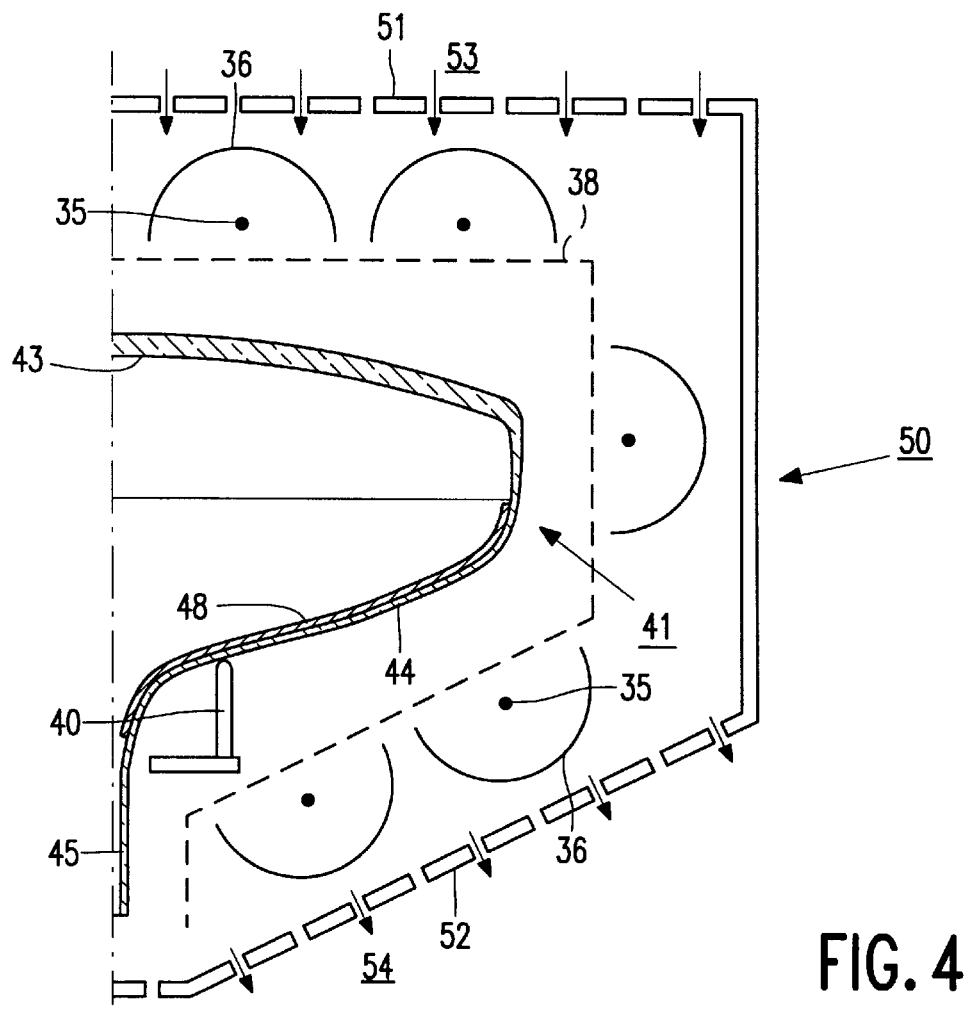
FIG. 4 is a schematic, cross-sectional view of a portion of a wall of a part of a cathode ray tube of a display device, which wall is provided with an absorbing coating in accordance with the invention.

FIG. 4 is a schematic, cross-sectional view of a portion of a cone 44 of a part of a cathode ray tube 41 of a display device, which cone 44 is provided, in this example, with an absorbing coating 48 in accordance with the invention. The cathode ray tube 41 further comprises a display screen 43 and a neck 45. The display screen 43, the cone 44 and the neck 45 are subjected to a temperature treatment which consists in (unilateral) irradiation with heat originating from heat radiators 35. Said heat radiators 35 predominantly comprise infrared heat radiators which preferably emit infrared electromagnetic radiation having a wavelength $\lambda$ below 3 $\mu$m. It is alternatively possible to use infrared heat radiators having a broader wavelength range, in which case an optical filter which selectively passes electromagnetic radiation having a wavelength $\lambda$ below 3 $\mu$m is arranged between the heat radiators and the surface to be irradiated. To direct the (heat) radiation originating from the heat radiators 35 towards the display screen 43, the cone 44 and the neck 45, use is made of reflectors 36 as shown in the example of FIG. 4. During the heat treatment of the predominantly glass parts of the cathode ray tube 41, said cathode ray tube 41 is supported by a support 40 and arranged in a cage 38 in order to protect the heat radiators 35 and the reflectors 36 against damage which may be caused in the event of fracture of the cathode ray tube 41 during the evacuation and concurrent heating of the cathode ray tube 41. In general, use will be made of a so-called conveyor oven to warm up and cool down the cathode ray tube 41, in which oven the products successively pass through different temperature zones in which the product is first warmed up and, at a later stage, cooled down. Such a conveyor oven is generally provided with conveying means for passing the cathode ray tube 41 through the different temperature zones. In this case, the support 40 forms part of the conveying means.

In the example of FIG. 4, the cathode ray tube 41 and the heat radiators 35 are surrounded by a further cage 50 which is provided with apertures at the side 51 facing away from the display screen 43 and at the opposite side 52, which apertures serve to pass the fluid. The apertures in the sides 51, 52 may have different dimensions and may be distributed at will over the sides 51, 52. By means of, for example, an (air-) pressure difference between the sides 51, 52, a direction of flow of the fluid can be set. In the example of FIG. 4, the inflow direction 53 and the outflow direction 54 of the gas are selected so that the gas has a cooling effect on the display screen 43, which results in a smaller temperature difference between the outer surface and the inner surface of the display screen 43 (smaller temperature gradient across the thickness of the wall of the display screen 43), so that the risk of fracture of the display screen 43 during the heat treatment is reduced. As a result, the warm-up of the display screen 43 can be accelerated.

The radiation-absorbing properties of the absorbing coating 48, being about a rapid and effective degasification of the coating 48 and/or a rapid warm-up of the wall of the cone 44.

By combining the various aspects of the invention, the object of the invention, i.e. the provision of a simple, rapid and flexible method of reducing the stresses occurring in the part, is achieved in an efficient manner.

It will be obvious that within the scope of the invention many variations are possible to those skilled in the art. Glass can very suitably be used to manufacture the wall of the part, in particular a type of glass which is suitable for the manufacture of display devices. The wall may alternatively be manufactured from other materials, such as quartz aluminium oxide or a synthetic resin. For the radiation-absorbing coating of a display device use can alternatively be made of the phosphors, the so-called black matrix and the aluminium layer provided on the inner surface of the display screen in a cathode ray tube. A suitable combination of short-wave radiation and long-wave radiation can also contribute to an effective warm-up of the wall of the part.

In general, the invention relates to a method in which a (display) device having a part comprising a first wall and a second wall is manufactured, which part is warmed up during the temperature treatment by unilateral irradiation with heat by means of heat radiators. The method is characterized in that the temperature treatment further comprises measures which cause a fluid to be fed past the outer surface of the first wall to remove heat from said outer surface and/or measures which cause a fluid to be fed past the inner surface of the second wall to supply heat to said second surface. In an embodiment, the inner surface of the second wall is provided with a heat-absorbing coating. Preferably, the heat radiators emit electromagnetic radiation having a wavelength below 3 $\mu$m.

We claim:

1. A method of manufacturing a device having a part (1) which comprises a wall (2) having a first surface (3) and an oppositely located second surface (4), said part (1) being subjected to a temperature treatment in which said part (1) is heated by irradiation with heat via the first surface (3) by means of heat radiators (5), the temperature treatment comprising further measures which, during heating of the part (1), cause the temperature of the second surface (4) to be increased, characterized in that, the second surface (4) is provided with a radiation absorbing coating (16) comprising a substance selected from the group consisting of iron oxide and a silicate.

2. A method as claimed in claim 1, characterized in that, in operation, the heat radiators emit predominantly electromagnetic radiation having a wavelength below 3 $\mu$m.

3. A method as claimed in claim 2, wherein in operation, the heat radiators emit predominantly electromagnetic radiation having a wavelength between about 0.3 and 2.7 $\mu$m.

4. A method as claimed in claim 1, wherein the device is a display device.

5. A method as claimed in claim 1, characterized in that, a fluid (8) is fed past the first surface (3), during heating of the part (1), to remove heat from the first surface (3).

6. A method as claimed in claim 5, characterized in that, the fluid (8) comprise a gas selected from the group consisting of nitrogen, oxygen and helium.

7. A method as claimed in claim 5, characterized in that, the fluid (8) comprises water.

* * * * *